US010808612B2

(12) United States Patent
Wiedemer et al.

(10) Patent No.: US 10,808,612 B2
(45) Date of Patent: Oct. 20, 2020

(54) RETAINING TAB FOR DIFFUSER SEAL RING

(71) Applicant: UNITED TECHNOLOGIES CORPORATION, Farmington, CT (US)

(72) Inventors: John D. Wiedemer, Glastonbury, CT (US); Dale William Petty, Wallingford, CT (US); Jonathan Lemoine, Vernon, CT (US); Jason Arnold, Rocky Hill, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 450 days.

(21) Appl. No.: 15/165,245

(22) Filed: May 26, 2016

(65) Prior Publication Data
US 2016/0348581 A1    Dec. 1, 2016

Related U.S. Application Data

(60) Provisional application No. 62/168,338, filed on May 29, 2015.

(51) Int. Cl.
F01D 25/24    (2006.01)
F02C 7/04    (2006.01)
(Continued)

(52) U.S. Cl.
CPC ............. F02C 7/04 (2013.01); F01D 11/001 (2013.01); F01D 11/02 (2013.01); F01D 11/12 (2013.01);
(Continued)

(58) Field of Classification Search
CPC ... F02C 7/04; F16J 15/44; F01D 25/24; F01D 11/12; F01D 11/02; F01D 11/001; F05D 2240/55; F05D 2220/323; F05D 2250/20
(Continued)

(56) References Cited

U.S. PATENT DOCUMENTS 3,018,113 A * 1/1962 Hall ...................... F01D 11/025
                                                                277/413
4,368,619 A    1/1983 Levesque
(Continued)

FOREIGN PATENT DOCUMENTS

DE    102007027364 A1    12/2007
EP          1640565 A2     9/2005

OTHER PUBLICATIONS

Extended European Search Report for European Application No. 16171705.3, dated Sep. 15, 2016.

Primary Examiner — J. Todd Newton
(74) Attorney, Agent, or Firm — Carlson, Gaskey & Olds, P.C.

(57) ABSTRACT

An example diffuser assembly includes a diffuser case, an annular ring, and a retaining tab that is mounted to the annular ring and has an end that engages an inner wall of the diffuser case. The engagement between the second end and the inner wall locks the retaining tab and limits movement of the annular ring along a central longitudinal axis of the diffuser case. Another example diffuser assembly includes a diffuser case, an annular ring, and a snap ring. The snap ring is situated in an annular groove of an inner wall of the diffuser case, and restricts movement of the annular ring along a central longitudinal axis of the diffuser case. A retaining tab is affixed to either the annular ring or the diffuser case, and has an end retaining the annular ring in the annular groove.

21 Claims, 12 Drawing Sheets

(51) Int. Cl.
  *F01D 11/02* (2006.01)
  *F01D 11/00* (2006.01)
  *F01D 11/12* (2006.01)
  *F16J 15/44* (2006.01)

(52) U.S. Cl.
  CPC .............. *F01D 25/24* (2013.01); *F16J 15/44* (2013.01); *F05D 2220/323* (2013.01); *F05D 2240/55* (2013.01); *F05D 2250/20* (2013.01)

(58) Field of Classification Search
  USPC ........................................................ 60/751
  See application file for complete search history.

(56) References Cited

U.S. PATENT DOCUMENTS

| | | | |
|---|---|---|---|
| 4,376,617 A | 3/1983 | Okano et al. | |
| 4,503,668 A * | 3/1985 | Duncan, III | F01D 9/042 |
| | | | 415/118 |
| 4,566,851 A * | 1/1986 | Comeau | F01D 9/042 |
| | | | 415/115 |
| 4,725,199 A * | 2/1988 | Johnson | F01D 25/26 |
| | | | 415/189 |
| 5,127,797 A * | 7/1992 | Carman | F01D 25/246 |
| | | | 415/209.2 |
| 5,137,284 A * | 8/1992 | Holder | F16J 15/3416 |
| | | | 277/390 |
| 5,289,677 A * | 3/1994 | Jarrell | F23R 3/60 |
| | | | 60/752 |
| 5,344,285 A | 9/1994 | O'Sullivan et al. | |
| 5,383,672 A * | 1/1995 | Cornelius | F16J 15/3268 |
| | | | 277/553 |
| 5,839,878 A | 11/1998 | Maier | |
| 5,996,331 A * | 12/1999 | Palmer | F02C 6/08 |
| | | | 415/115 |
| 7,226,054 B2 * | 6/2007 | Addis | F16J 15/3288 |
| | | | 277/355 |
| 7,607,286 B2 | 10/2009 | Suciu et al. | |
| 7,931,276 B2 * | 4/2011 | Szymbor | F16J 15/3288 |
| | | | 277/355 |
| 8,166,746 B2 | 5/2012 | Heyerman | |
| 8,672,630 B2 | 3/2014 | Suciu et al. | |
| 8,869,538 B2 | 10/2014 | Nanda et al. | |
| 9,822,664 B1 * | 11/2017 | Kush | F01D 25/24 |
| 9,863,259 B2 * | 1/2018 | Boeke | F01D 9/042 |
| 2006/0053768 A1 * | 3/2006 | Anderson | F01D 25/243 |
| | | | 60/226.1 |
| 2006/0056957 A1 * | 3/2006 | Dong | F01D 11/001 |
| | | | 415/110 |
| 2007/0022738 A1 | 2/2007 | Norris et al. | |
| 2008/0008584 A1 * | 1/2008 | Shteyman | F01D 25/246 |
| | | | 415/209.2 |
| 2009/0004032 A1 * | 1/2009 | Kaupert | F01D 11/001 |
| | | | 417/365 |
| 2010/0007093 A1 * | 1/2010 | Grondahl | F16J 15/3292 |
| | | | 277/500 |
| 2012/0023968 A1 * | 2/2012 | Shteyman | F01D 25/30 |
| | | | 60/796 |
| 2013/0192260 A1 * | 8/2013 | Mayer | F01D 11/003 |
| | | | 60/805 |
| 2014/0241857 A1 * | 8/2014 | Chuong | F02C 7/28 |
| | | | 415/111 |
| 2014/0314556 A1 * | 10/2014 | Fremont | F01D 5/284 |
| | | | 415/200 |
| 2015/0330245 A1 * | 11/2015 | Vo | F02C 7/28 |
| | | | 415/173.1 |
| 2016/0177765 A1 * | 6/2016 | Lemoine | F01D 11/005 |
| | | | 415/214.1 |
| 2017/0051751 A1 * | 2/2017 | Ackermann | F01D 5/06 |
| 2017/0276006 A1 * | 9/2017 | Ponchak | F01D 11/003 |

* cited by examiner

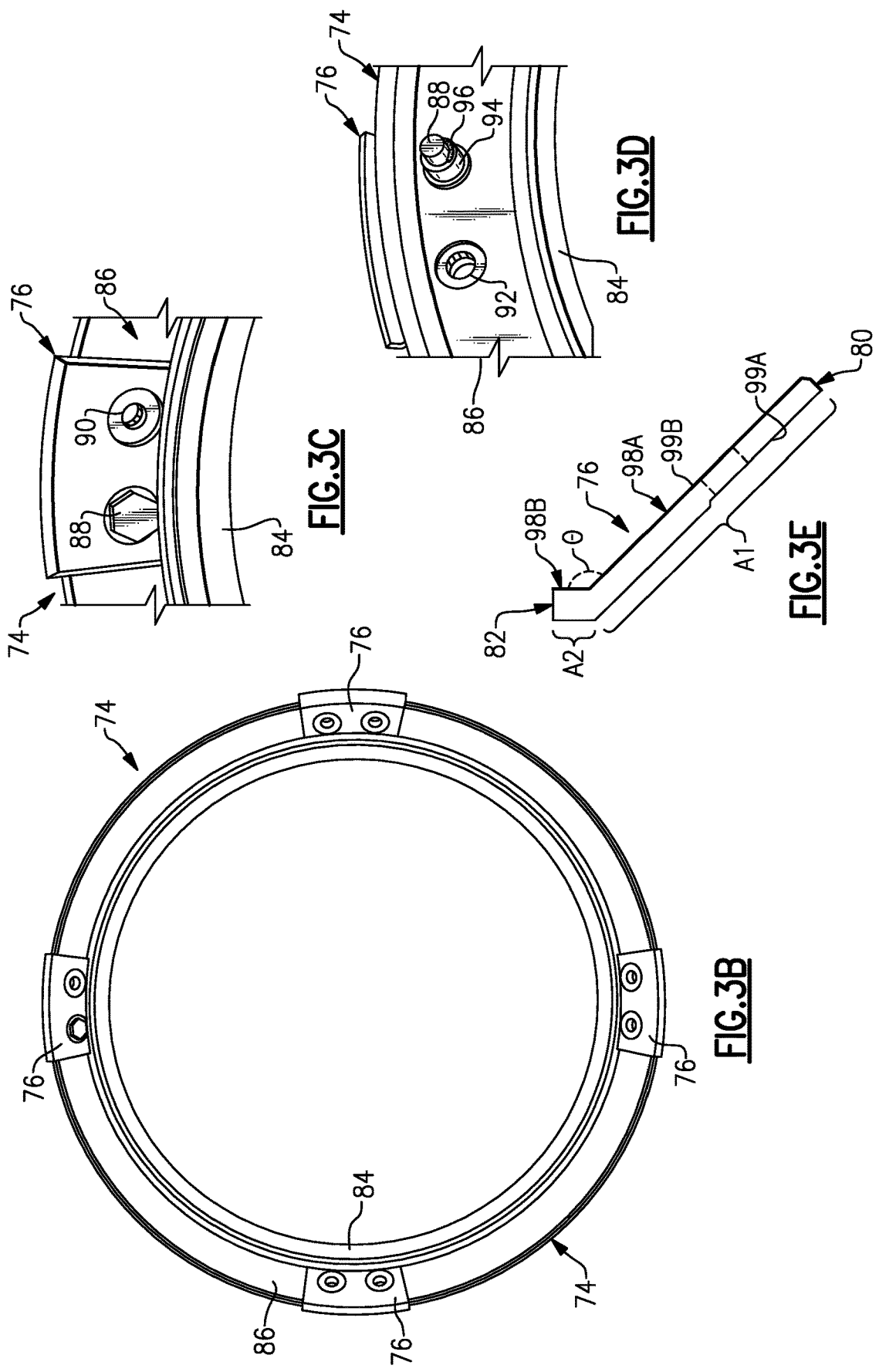

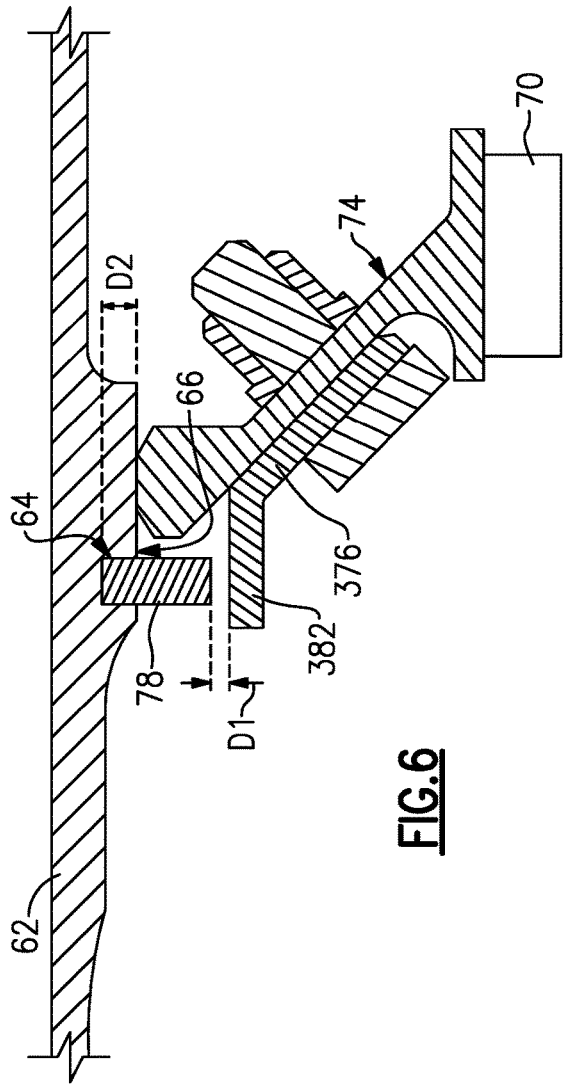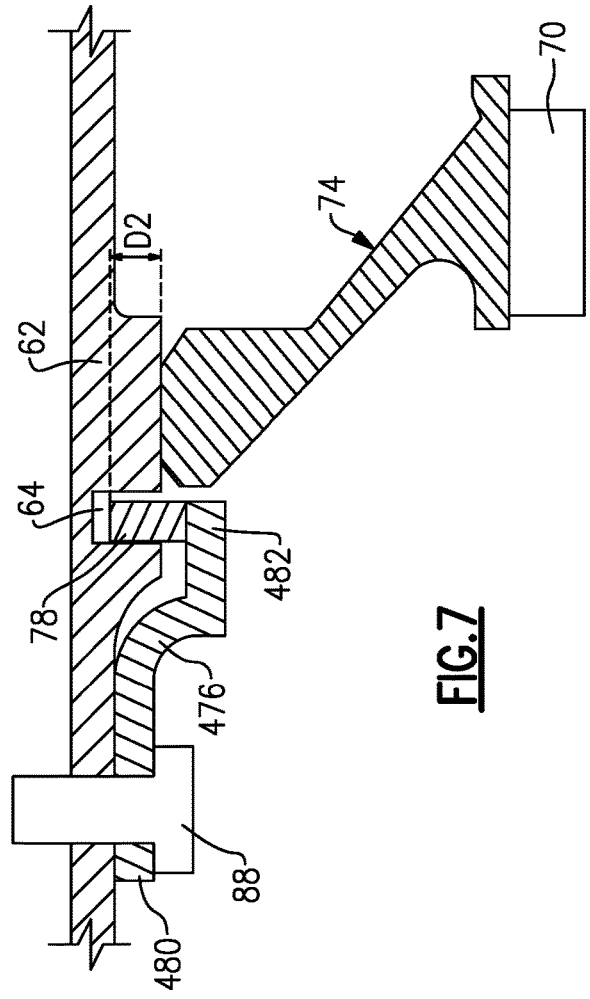

RETAINING TAB FOR DIFFUSER SEAL RING

CROSS-REFERENCE TO RELATED APPLICATION

This application claims priority to U.S. Provisional Application No. 62/168,338, filed May 29, 2015, the disclosure of which is incorporated by reference in its entirety.

FIELD OF THE DISCLOSURE

This disclosure relates to gas turbine engines, and more particularly to a retaining tab for securing components in such engines, such as an annular ring in a diffuser case.

BACKGROUND

Gas turbine engines typically include a diffuser section situated between a high pressure compressor and a combustor section. The diffuser may include an annular ring that forms an air seal within a diffuser case. The seal may be used for thrust balancing and/or controlling airflow, for example.

SUMMARY

One example of a diffuser assembly includes a diffuser case, an annular ring, and a retaining tab that is mounted to the annular ring and has an end that engages an inner wall of the diffuser case. The engagement between the second end and the inner wall locks the retaining tab and limits movement of the annular ring along a central longitudinal axis of the diffuser case.

In another example of the above described diffuser assembly, the end of the retaining tab is a second end that is part of a secondary portion of the retaining tab that extends radially outwards from the central longitudinal axis, and an opposite first end of the retaining tab is part of a primary portion of the retaining tab that is angled with respect to the secondary portion at an obtuse angle.

In another example of any of the above described diffuser assemblies, an area of the primary portion is greater than an area of the secondary portion.

In another example of any of the above described diffuser assemblies, the annular ring is configured as a seal within the diffuser case.

In another example of any of the above described diffuser assemblies, the diffuser case defines an annular groove along its inner wall, and the end of the retaining tab is situated in the annular groove.

In another example of any of the above described diffuser assemblies, a snap ring is situated in the annular groove, and the end of the retaining tab is situated between opposing ends of the snap ring.

In another example of any of the above described diffuser assemblies, a slot is situated within the annular groove, the retaining tab includes a tooth that engages an end wall within the slot, and the engagement between the tooth and the end wall limits rotation of the annular ring about the central longitudinal axis.

In another example of any of the above described diffuser assemblies, the annular ring comprises an inner cylindrical section and an outer frustoconical section that is sloped with respect to the cylindrical section. An inner diameter of the frustoconical section connects to the cylindrical section, and an outer diameter of the frustoconical section abuts the inner wall.

In another example of any of the above described diffuser assemblies, each retaining tab is mounted to the annular ring via one or more fasteners, with each fastener extending through an opening in the retaining tab that is aligned with an opening in the frustoconical section.

In another example of any of the above described diffuser assemblies, the retaining tab is situated between a head of the fastener and an inner face of the frustoconical portion, and the annular ring provides an open band around the head of the fastener.

In another example of any of the above described diffuser assemblies, the open band has a diameter that is at least three times larger than a diameter of the opening in the retaining tab.

In another example of any of the above described diffuser assemblies, the end of the retaining tab is a second end that is opposite a first end, and the opening in the frustoconical section is closer to the first end of the retaining tab than to the second end of the retaining tab.

One example of a method includes mounting a first end of a retaining tab to a frustoconical section of an annular ring that is sloped with respect to a cylindrical section of the annular ring, the annular ring being situated within a diffuser case of a gas turbine engine. The method also includes engaging an opposite second end of the retaining tab with an inner wall of the diffuser case, the engagement between the second end and the inner wall locking the retaining tab and limiting movement of the annular ring along a central longitudinal axis of the diffuser case.

In another example of the above described method, the diffuser case defines an annular groove along its inner wall, and the engaging comprises situating the second end of the retaining tab in the annular groove.

In another example of any of the above described methods, the mounting and engaging are performed such that the annular ring is aft of the annular groove.

One example of a gas turbine engine includes a high pressure compressor, a combustor that is in fluid communication with the high pressure compressor, a diffuser case situated between the high pressure compressor and combustor, and an annular ring situated within the diffuser case. A retaining tab has a first end that is mounted to the annular ring and an opposite second end that engages an inner wall of the diffuser case. The engagement between the second end and the inner wall locks the retaining tab and limits movement of the annular ring along a central longitudinal axis of the gas turbine engine.

One example of a diffuser assembly includes a diffuser case, an annular ring, and a snap ring situated in an annular groove of an inner wall of the diffuser case. The snap ring restricts movement of the annular ring along a central longitudinal axis of the diffuser case. A retaining tab is affixed to either the annular ring or the diffuser case, and has an end retaining the annular ring in the annular groove.

In another example of the above described diffuser assembly, the end extends in a direction that is parallel to the central longitudinal axis.

In another example of any of the above described diffuser assemblies, the end is a second end that is cantilevered and is opposite of a first end, and the retaining tab is affixed to the annular ring or the diffuser case at the first end.

In another example of any of the above described diffuser assemblies, the second end abuts the snap ring.

In another example of any of the above described diffuser assemblies, a radial distance between the second end and an inner diameter of the snap ring is less than a radial distance between an outer diameter of the snap ring and the inner wall.

The examples and alternatives of the preceding paragraphs, the claims, or the following description and drawings, including any of their various aspects or respective individual features, may be taken independently or in any combination. Features described in connection with one example are applicable to all examples, unless such features are incompatible.

BRIEF DESCRIPTION OF THE DRAWINGS

FIGS. 3A-E schematically illustrate examples of a retaining tab that restricts movement of an annular ring along an engine central longitudinal axis.

FIG. 6 schematically illustrates another example of a retaining tab that restricts movement of an annular ring in conjunction with a snap ring.

FIG. 7 schematically illustrates another example of a retaining tab that restricts movement of an annular ring in conjunction with a snap ring.

DETAILED DESCRIPTION

Figure 1:
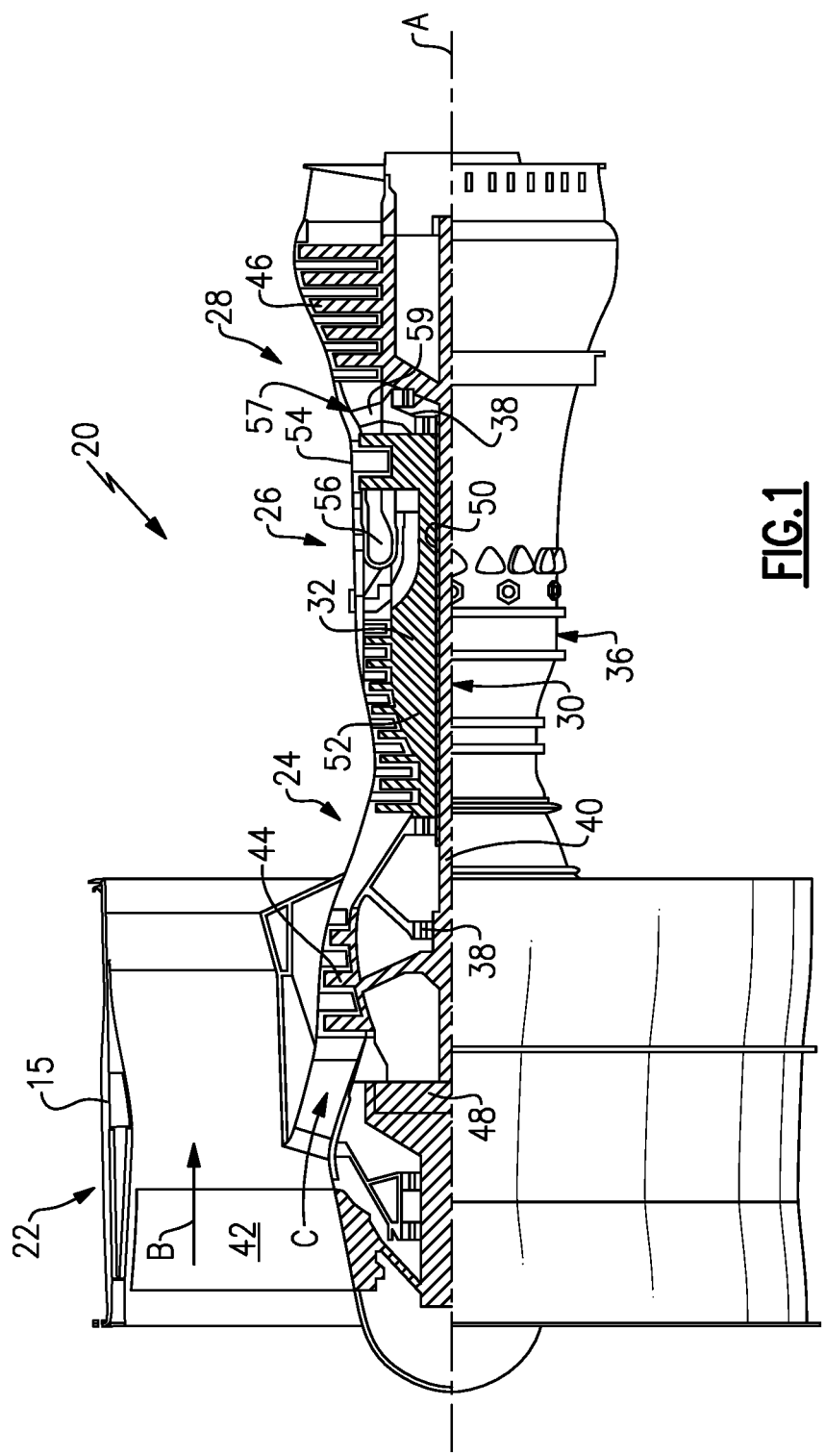
FIG. 1 illustrates a schematic, cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]$^{0.5}$. The "Low corrected fan tip speed" as disclosed herein according to one non-limiting embodiment is less than about 1150 ft/second (350.5 meters/second).

Figure 2:
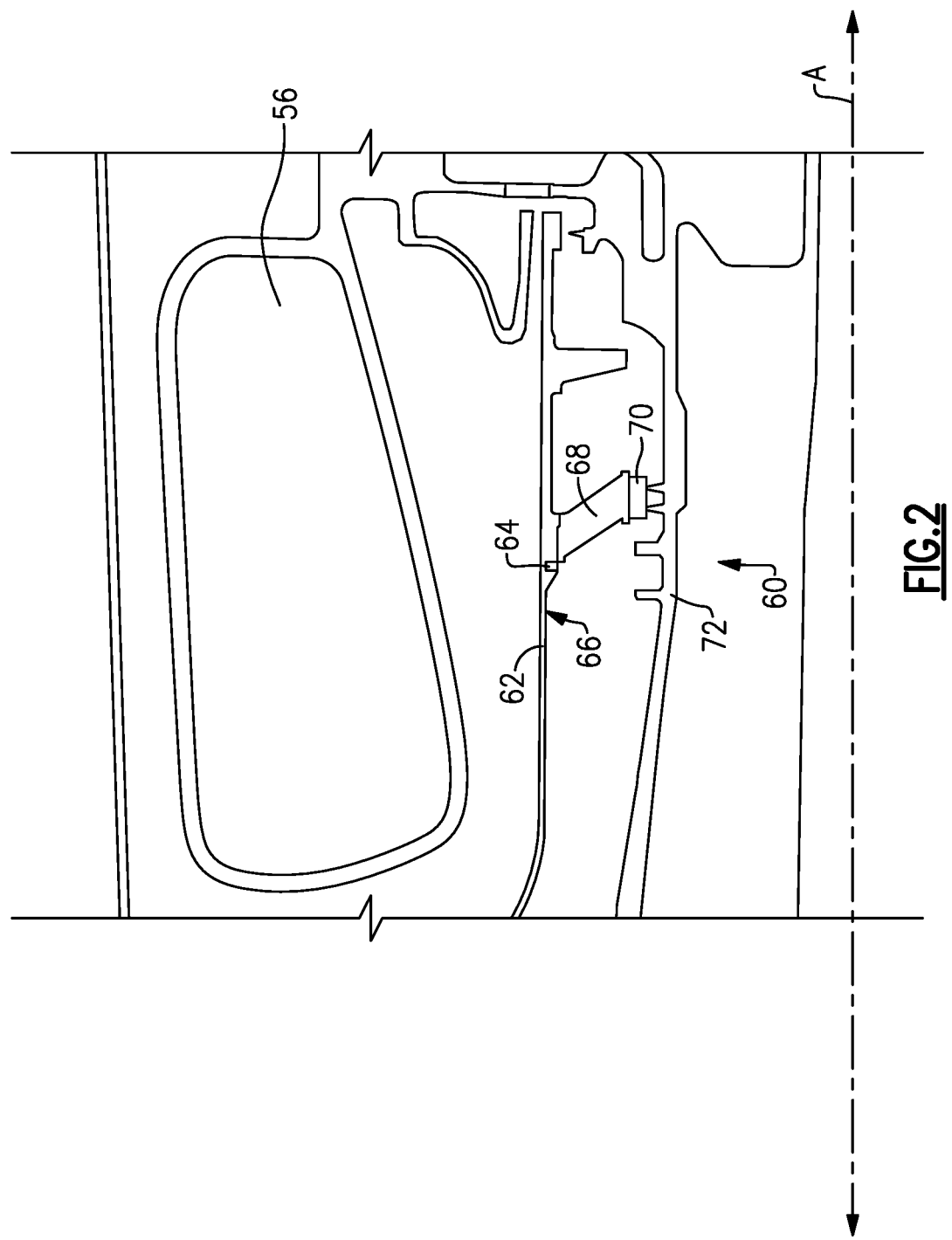
FIG. 2 illustrates a schematic, cross-sectional view of a portion of a gas turbine engine.

FIG. 2 schematically illustrates a schematic, cross-sectional view of a portion of the gas turbine engine 20 which includes the combustor 56 and a diffuser 60. The diffuser 60 includes a diffuser case 62 which is static and defines an annular groove 64 along its inner wall 66. A diffuser assembly 68 is situated between a seal member 70 and the inner wall 66. The diffuser assembly 68 and seal member 70 collectively provide an air seal (e.g., for thrust balancing and/or controlling airflow). A rotor 72, which is part of high pressure compressor 52, rotates within the diffuser case 62. In one example, the rotor 72 is part of, or coupled with, the outer shaft 50.

Figure 3A:
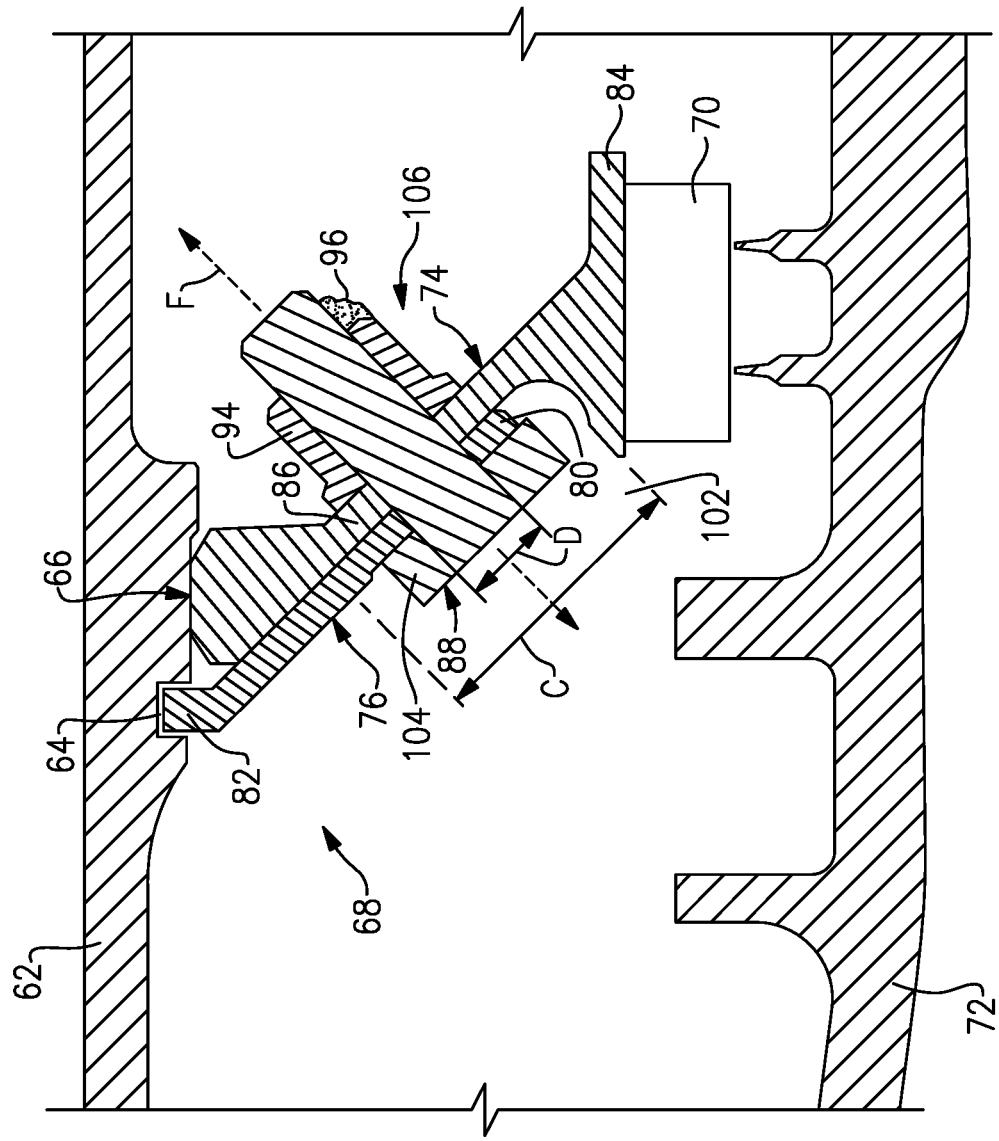

FIG. 3A-E schematically illustrate examples of the diffuser assembly 68. In the example of FIG. 3A, the diffuser assembly 68 includes an annular ring 74 that is mounted to a retaining tab 76. The retaining tab 76 restricts movement of the annular ring 74 along the central engine longitudinal axis A. The diffuser assembly 68 may replace a split or snap ring 78 that could otherwise be situated in the annular groove 64. Alternatively, as discussed below in connection with FIGS. 5A-B for example, the diffuser assembly 68 may be used in conjunction with the snap ring 78, and may be situated in a way that reduces the potential that the snap ring 78 dislodges from the annular groove 64.

The retaining tab 76 includes a first end 80 that is mounted to the annular ring 74, and an opposite second end 82 that engages the inner wall 66 of the diffuser case 62. The engagement locks the retaining tab 76 and restricts movement of the retaining tab 76, which in turn restricts movement of the annular ring 74 along the axis A. In particular, in this example, the second end 82 is situated in the annular groove 64 of the inner wall 66.

FIG. 3B schematically illustrates a fore view of the annular ring 74, in which a plurality of the retaining tabs 76 are substantially equally spaced apart from each other along an outer circumference of the annular ring 74. Although four retaining tabs 76 are shown in FIG. 3B, it is understood that greater or fewer quantities of tabs could be used (e.g., three tabs that are substantially equally spaced apart from each other, or greater than four tabs).

The annular ring 74 comprises an inner cylindrical section 84 and an outer frustoconical section 86 that is sloped with respect to the cylindrical section 84. An inner diameter of the frustoconical section 86 connects to the cylindrical section 84, and an outer diameter of the frustoconical section 86 abuts the inner wall 66. Each retaining tab 76 is mounted to the annular ring 74 via one or more fasteners 88. Each fastener 88 extends through an opening 90 in the retaining tab 76 that is aligned with an opening 92 in the frustoconical section 86.

FIG. 3C schematically illustrates a fore view of the retaining tab 76, and FIG. 3D illustrates an aft view of the retaining tab 76 with a single fastener 88 being shown that mounts the retaining tab 76 to the annular ring 74. The openings 90 in the retaining tab 76 may be recessed and/or countersunk. Although a bolt fastener 88 is shown in FIGS. 3A-B, it is understood that this is only an example and that other types of fasteners could be used, such as screws and/or rivets. In this regard, reference numeral 88 will be used to generically refer to a fastener without being limited to being a bolt. Also, although only one fastener 88 is shown in FIGS. 3B-C, it is understood that multiple fasteners 88 could be used in each retaining tab 76.

As shown in FIG. 3D, a nut 94 may be threaded onto the fastener 88 for a bolt type of fastener, on an aft side of the snap ring 78. Optionally, the diffuser assembly 68 may include a weld 96 that contacts the nut 94 and the bolt (e.g., a tack weld) and limits and/or prevents rotation of the nut 94 with respect to the bolt. In one example, the nut 94 is a locking nut.

As shown in FIG. 3E, the second end 82 of the retaining tab is part of a secondary portion 98B of the retaining tab 76 that extends radially outwards from the central longitudinal axis A of the engine 20, and the first end 80 of the retaining tab is part of a primary portion 98A of the retaining tab 76 that is angled with respect to the secondary portion 98B at an obtuse angle θ. For example, the area A1 of the primary portion 98A of the retaining tab 76 is larger than the area A2 of the secondary portion 98B of the retaining tab 76. The primary portion 98A includes an inner face 99A and an outer face 99B.

Referring again to FIG. 3A, for each fastener 88, a central axis F of the fastener 88 is perpendicular to each of the retaining tab 76 and the frustoconical section 86. Also, the opening 92 in the frustoconical section 86 is closer to the first end 80 of the retaining tab 76 than to the second end 82 of the retaining tab 76.

The annular ring 74 provides an open band 102 around a head 104 of the fastener 88 which permits clearance for a tool (e.g., a socket tool) to engage the head 104. For instance, the seal member 70 and portion of the annular ring 74 to which the seal member 70 is attached are clear of the region of the head 104. In one example, the open band 102 has a diameter C that is at least three times larger than a diameter D of the opening 90 in the retaining tab 76. In some examples, the diameter C is at least four times larger than the diameter D. However, increasingly larger ratios of the diameter (e.g., above 20 or 30), may consume too much space to be practical. Of course, it is understood that these are only examples, and that other diameters would be possible. Similarly, an open area 106 is also provided around a terminal end of the fastener 88 that provides clearance for a tool to engage the nut 94.

In one example, the retaining tab 76 and/or annular ring 74 are composed of a nickel alloy (e.g., AMS 5707), and the fastener 88 is composed of a different nickel alloy (e.g., AMS 5708). Of course, it is understood that these are just examples, and that other materials could be used.

Figure 4A:
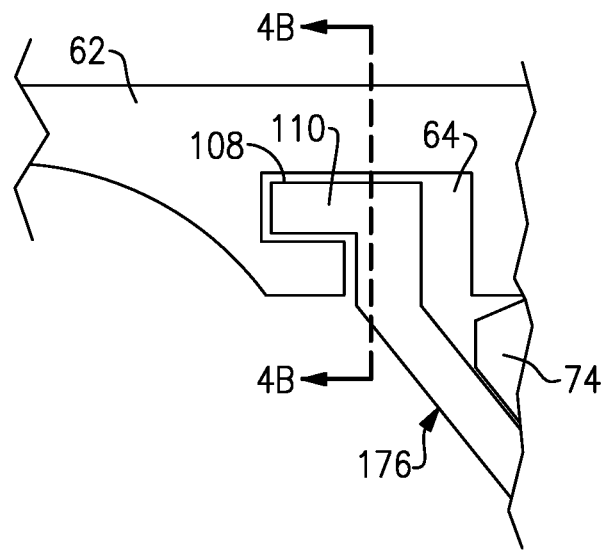
FIGS. 4A-B schematically illustrate an example of a retaining tab that restricts movement of an annular ring using a dual engagement feature.
Figure 4B:
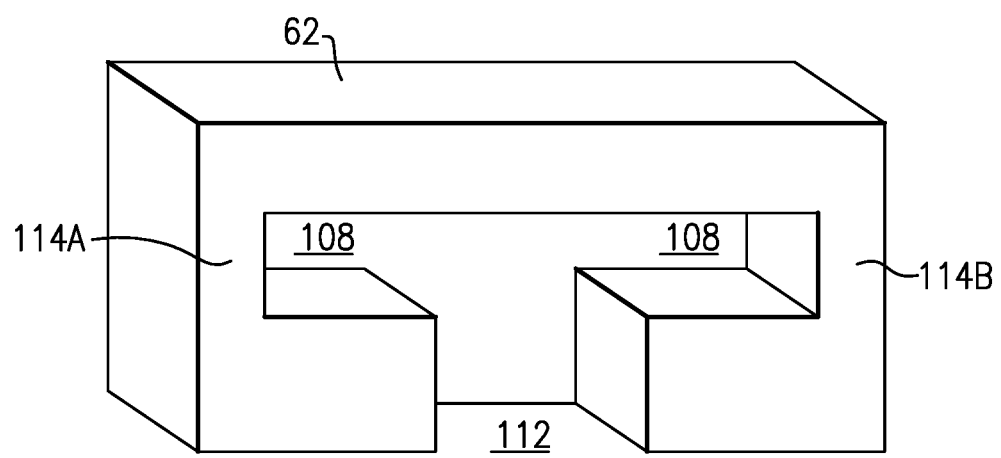

FIGS. 4A-B schematically illustrate another example of a retaining tab 176 that restricts movement of the annular ring 74. In this example, there is a slot 108 situated within a fore side of the annular groove 64, and the retaining tab 176 includes one or more teeth 110 situated in the slot 108 to restrict rotation of the annular ring 74 about the axis A when the retaining tab 176 is fastened to the annular ring 74.

FIG. 4B schematically illustrates a sectional view of the diffuser case 62. There is a recessed area 112 in the diffuser case 62 that allows the tooth 110 to slide radially outwards within the annular groove 64. The retaining tab 176 can then be rotated within the slot 108, at which time the tooth can engage an end wall 114A or 114B to limit further rotation of the retaining tab 176. The example of FIGS. 4A-B thereby provides a dual engagement by restricting movement along axis A and restricting rotation about the axis A.

Figure 5A:
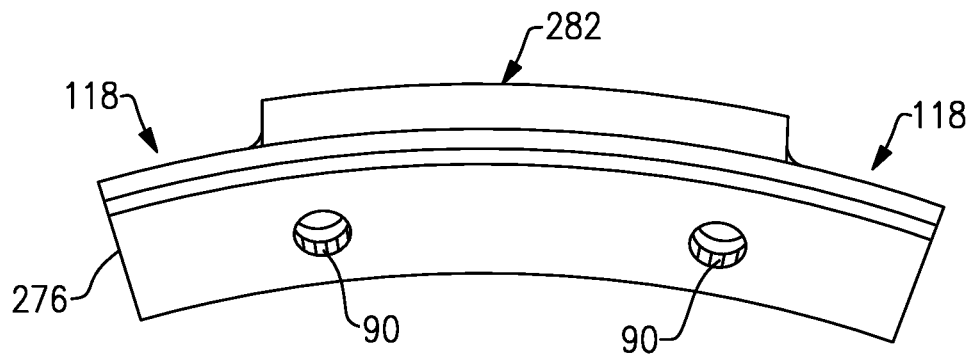
FIGS. 5A-B schematically illustrate an example of a retaining tab that restricts movement of an annular ring in conjunction with a snap ring.
Figure 5B:
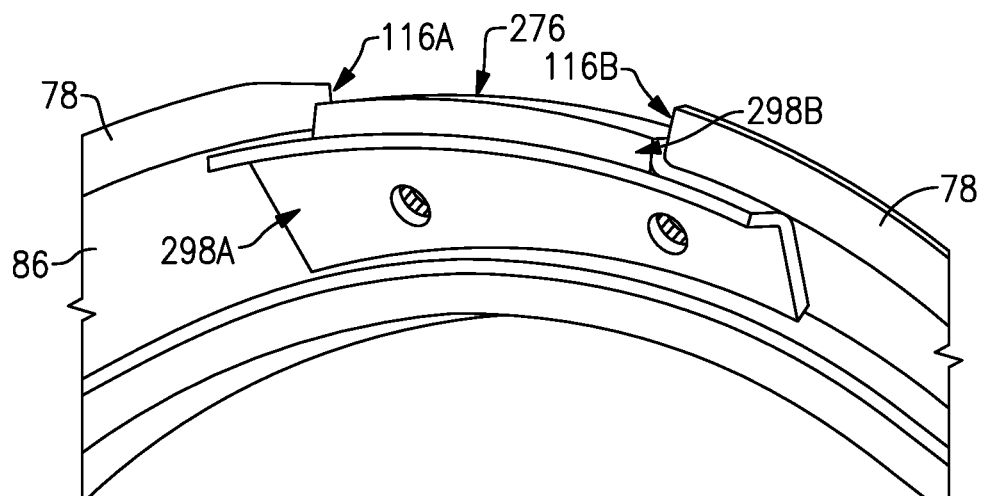

FIGS. 5A-B schematically illustrate an example of a retaining tab 276 that restricts movement of annular ring 74 in conjunction with a snap ring 78 that is situated in the annular groove 64. If the opposing ends 116A-B of the snap ring 78 are biased together, an outer diameter of the snap ring 78 is reduced so that the snap ring 78 can be situated in the annular groove 64. When the opposing ends 116A-B are released, the snap ring 78 will spring outwardly back to its original shape and will generally remain seated in the annular groove 64. High engine temperatures have the potential to cause the snap ring 78 to dislodge from the annular groove 64. The retaining tab 276, however, reduces the potential for such an occurrence. The end 282 of the retaining tab 276 is situated between the opposing terminal ends 116A-B of the snap ring 78. In this example, the openings 90 in the retaining tab 276 may be further spaced apart from each other than the openings 90 in the retaining tab 76 shown in FIGS. 3B-D. The primary portion 298A of the retaining tab 276 extends radially outward from the secondary portion 298B of the retaining tab 276 to provide shoulder sections 118 that abut the snap ring 78, and reduce the potential that the snap ring 78 dislodges from the annular groove 64. The shoulder sections 118 block the snap ring 78 before it can dislodge from the annular groove 64.

FIG. 6 schematically illustrates another example of a retaining tab 376 that restricts movement of annular ring 74 in conjunction with snap ring 78. In this example, the second end 382 of the retaining tab 376 extends in a direction that is parallel to the central longitudinal axis A, instead of extending radially outward from the axis A. Also, instead of engaging the inner wall 66 of the diffuser case 62, the second end 382 reduces the potential that the snap ring 78 dislodges from the annular groove 64. Although the second end 382 is shown as being spaced apart from the snap ring 78, it is understood that the second end 382 could instead abut the snap ring 78. A radial distance D1 between the second end 382 and an inner diameter of the snap ring 78 is less than a radial distance D2 between an outer diameter of the snap ring 78 and the inner wall 66, so that the second end 382 blocks the snap ring 78 before it can dislodge from the annular groove 64.

FIG. 7 schematically illustrates an example of a retaining tab 476 that restricts movement of annular ring 74 in conjunction with snap ring 78. In this example, retaining tab 476 is not fastened to the annular ring 74, but is instead fastened to the diffuser case 62. In particular, a first end 480 of the retaining tab 476 is mounted to the diffuser case 62 via one or more of the fasteners 88 (e.g., bolts, screws, rivets), and a second end 482 of the retaining tab 476 reduces the potential that the snap ring 78 dislodges from the annular groove 64. Here too, a radial distance D1 between the second end 482 and an inner diameter of the snap ring 78 is less than a radial distance D2 between an outer diameter of the snap ring 78 and the inner wall 66, so that the second end 482 blocks the snap ring 78 before it can dislodge from the annular groove 64. In the example of FIG. 7, D1 is zero and is therefore not shown.

Figure 8:
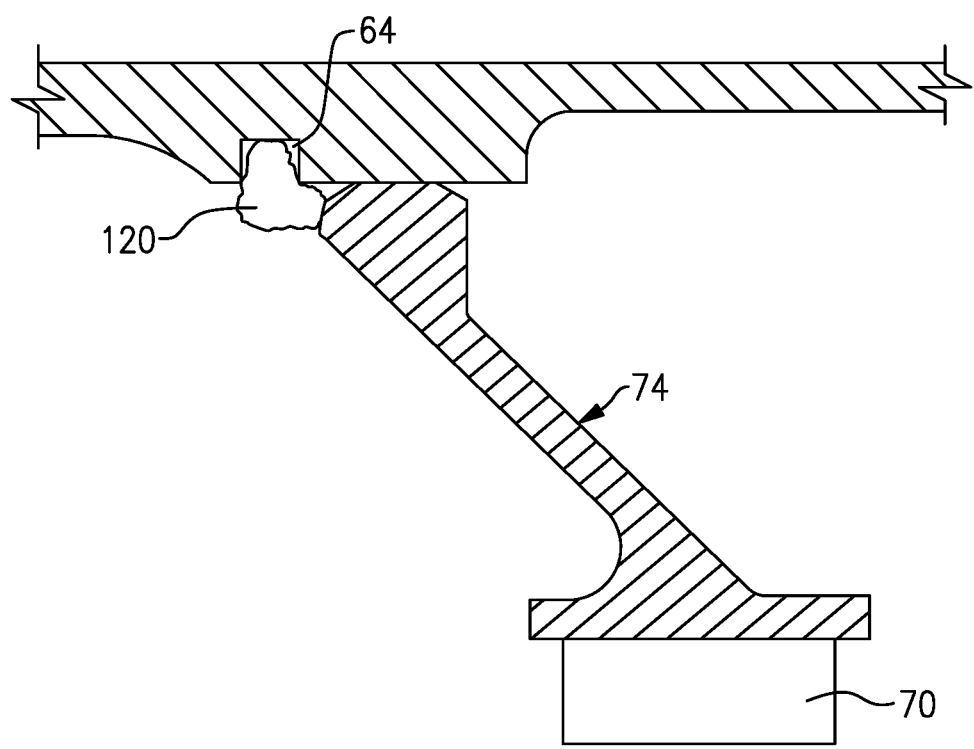
FIG. 8 schematically illustrates an example that uses a weld to restrict movement of an annular ring.

FIG. 8 schematically illustrates an example that omits the snap ring 78 and retaining tab and instead uses one or more welds 120 to restrict movement of the annular ring 74 along the central longitudinal axis A. The one or more welds 120 are at least partially situated within the annular groove 64. In one example, three or four welds 120 are used that are substantially equally circumferentially spaced apart from each other within the annular groove 64. Optionally, the welds may contact the annular ring 74 to also restrict rotation of the annular ring 74 about the axis A.

Figure 9A:
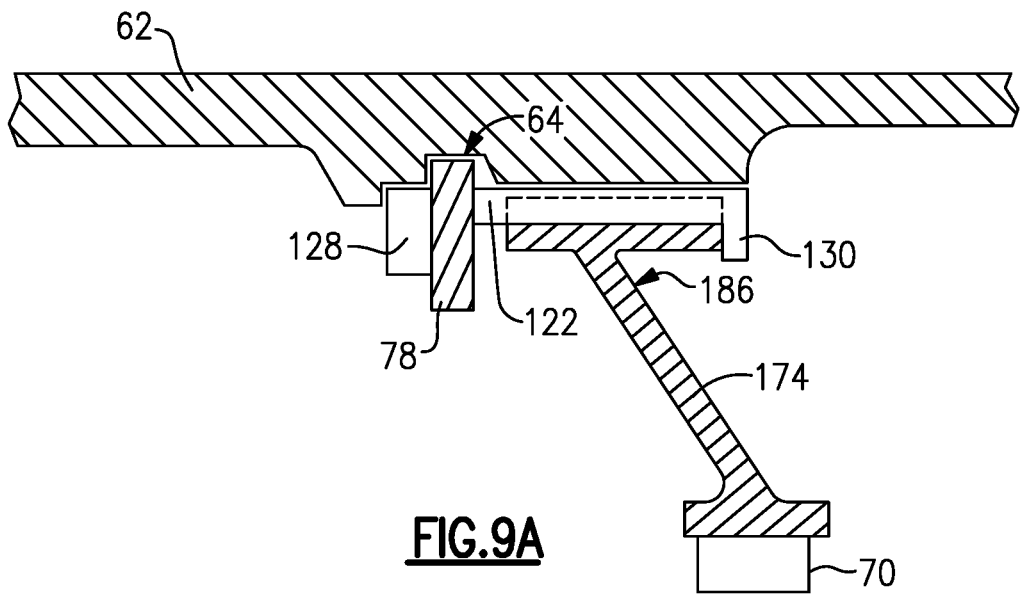
FIGS. 9A-C schematically illustrate examples of a retaining tab that restricts movement of an annular ring in conjunction with a snap ring.
Figure 9B:
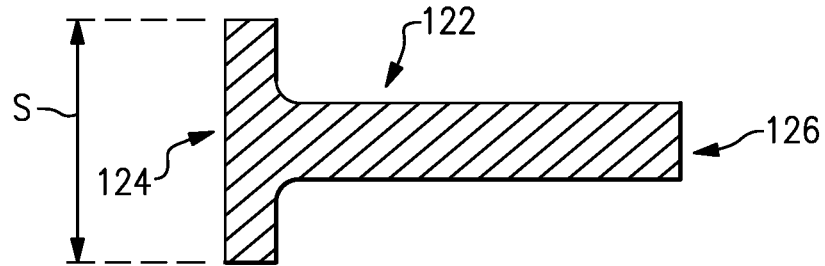
Figure 9C:
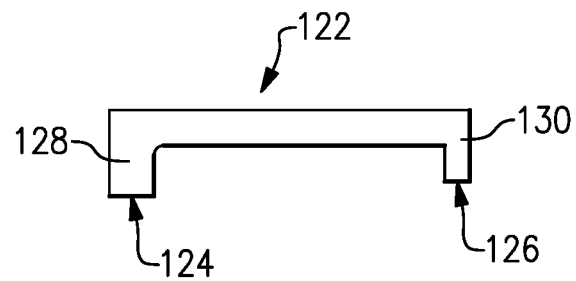

FIGS. 9A-C schematically illustrate examples of a retaining tab 122 that restricts movement of annular ring 174 along axis A in conjunction with snap ring 78. The retaining tab 122 is inserted between the opposing ends 116A-B of the snap ring 78 (see FIG. 5B) to retain the snap ring 78 within the annular groove 64. FIG. 9B schematically illustrates a top view of the retaining tab 122, while FIG. 9C schematically illustrates a side view of the retaining tab 122. An outer diameter of the frustoconical section 186 of the annular ring 174 has a different profile than that of the annular ring 74 shown in FIG. 3A, but it is understood that the same profile could be used if desired.

The retaining tab 122 includes a first end 124 and an opposite second end 126. A span S of the first end 124 may be sized to substantially fill a gap between the opposing ends 116A-B of the snap ring 78 (similar to the example of FIG. 5B). The first end 124 includes an arm 128 that abuts the snap ring 78. The second end 126 of the retaining tab 122 includes an arm 130 that abuts the annular ring 174, such that the retaining tab 122 restricts movement of the annular ring 174 along the central longitudinal axis A in either a fore or an aft direction. In one example, the arm 130 is formed by bending the retaining tab 122 after it has been inserted in an aft direction between the case and the annular ring 174. Of course, it would also be possible to instead form the arm 128 after inserting the retaining tab 122 in a fore direction instead. The retaining tab 122 may be situated within a groove in an outer diameter of the frustoconical section 186 (similar to groove 134 in FIG. 10B).

Figure 10A:
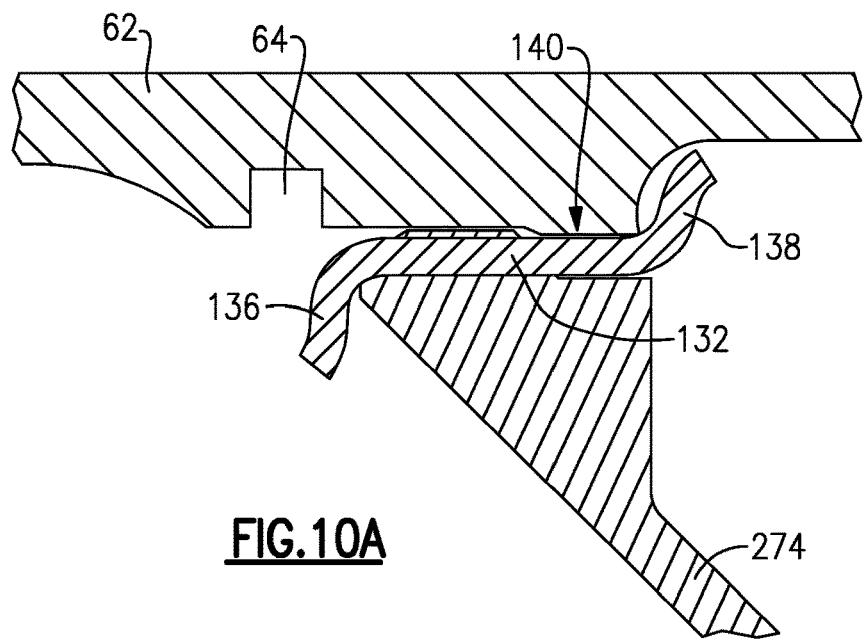
FIGS. 10A-B schematically illustrate another example of a retaining tab that restricts movement of an annular ring.
Figure 10B:
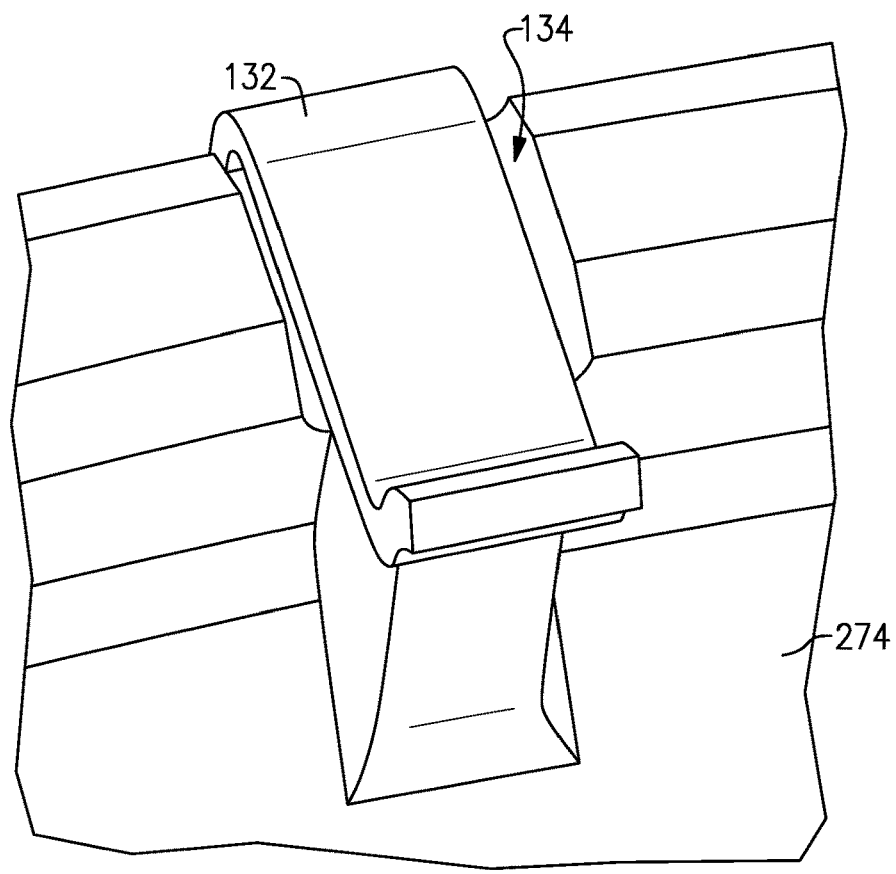

FIGS. 10A-B schematically illustrate an example in which snap ring 78 is omitted, and a retaining tab 132 is used which resides in a groove 134 in the annular ring 274. The retaining tab 132 includes a first arm 136 that is angled towards the central longitudinal axis A, and a second arm 138 that is angled away from the central longitudinal axis A. The first arm 136 restricts movement of the annular ring 274 along the axis A in a fore direction, and the second arm 138 restricts movement of the annular ring 274 along the axis A in an aft direction. A ridge 140 within the diffuser case 62 facilitates the restricted movement. FIG. 10B illustrates a perspective view of the example of FIG. 10A. An outer diameter of the annular ring 274 has a different profile than that of annular ring 74 shown in FIG. 3A, but it is understood that the same profile could be used if desired.

Figure 11:
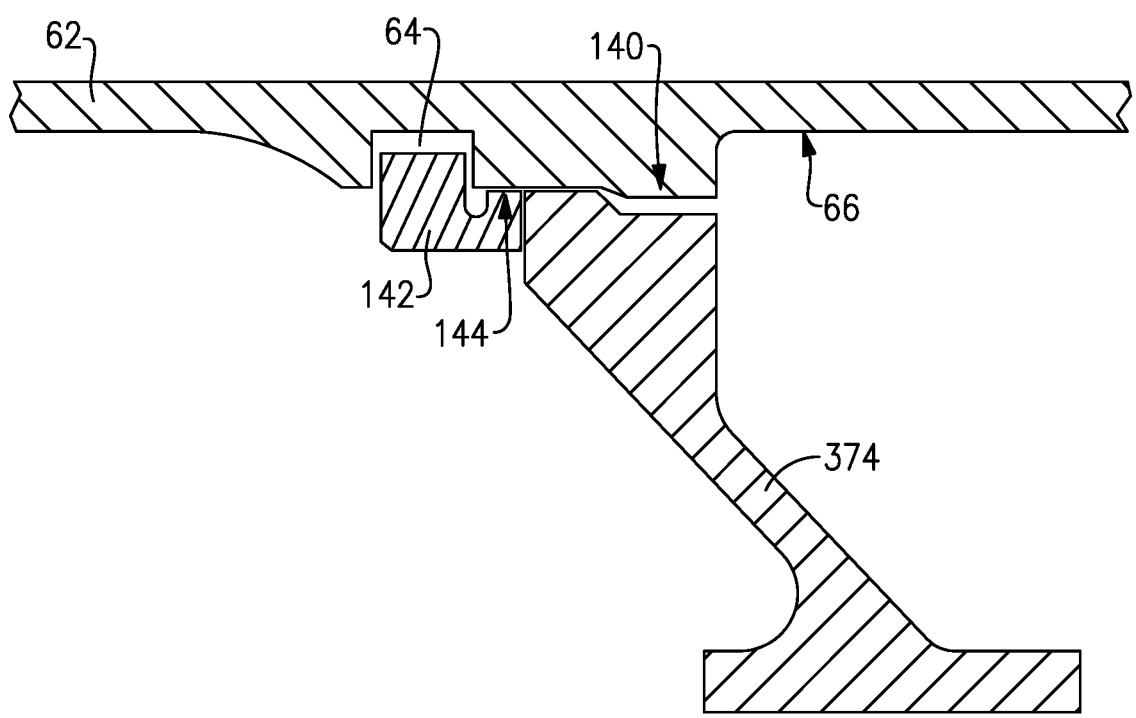
FIG. 11 schematically illustrates an example in which a retaining hoop is used to restrict movement of an annular ring.

FIG. 11 schematically illustrates an example in which a retaining hoop 142 restricts movement of annular ring 374 along axis A. Optionally, a retaining tab 76 can be omitted in this example as well omitting snap ring 78. The hoop 142 engages the annular groove 64. Unlike the snap ring 78 which can be biased inwards by advancing the terminal ends towards each other, the full hoop 142 lacks such a feature. Seating the hoop 142 within the annular groove 64 involves heating the diffuser case 62 so that it expands and permits advancement of the hoop 142 in an aft direction into the annular groove 64. Once the diffuser case 62 cools, the hoop 142 will be at least partially seated in the groove, to restrict movement of the annular ring 374 in a fore direction along the central longitudinal axis A. Ridge 140 on the inner wall 66 of the diffuser case 62, meanwhile, restricts movement of the annular ring 374 in an aft direction along the central longitudinal axis A. In the example of FIG. 11, a portion 144 of the hoop 142 is situated in close proximity to the inner wall 66, which restricts radial movement of the hoop 142 within the groove 64.

Figure 12:
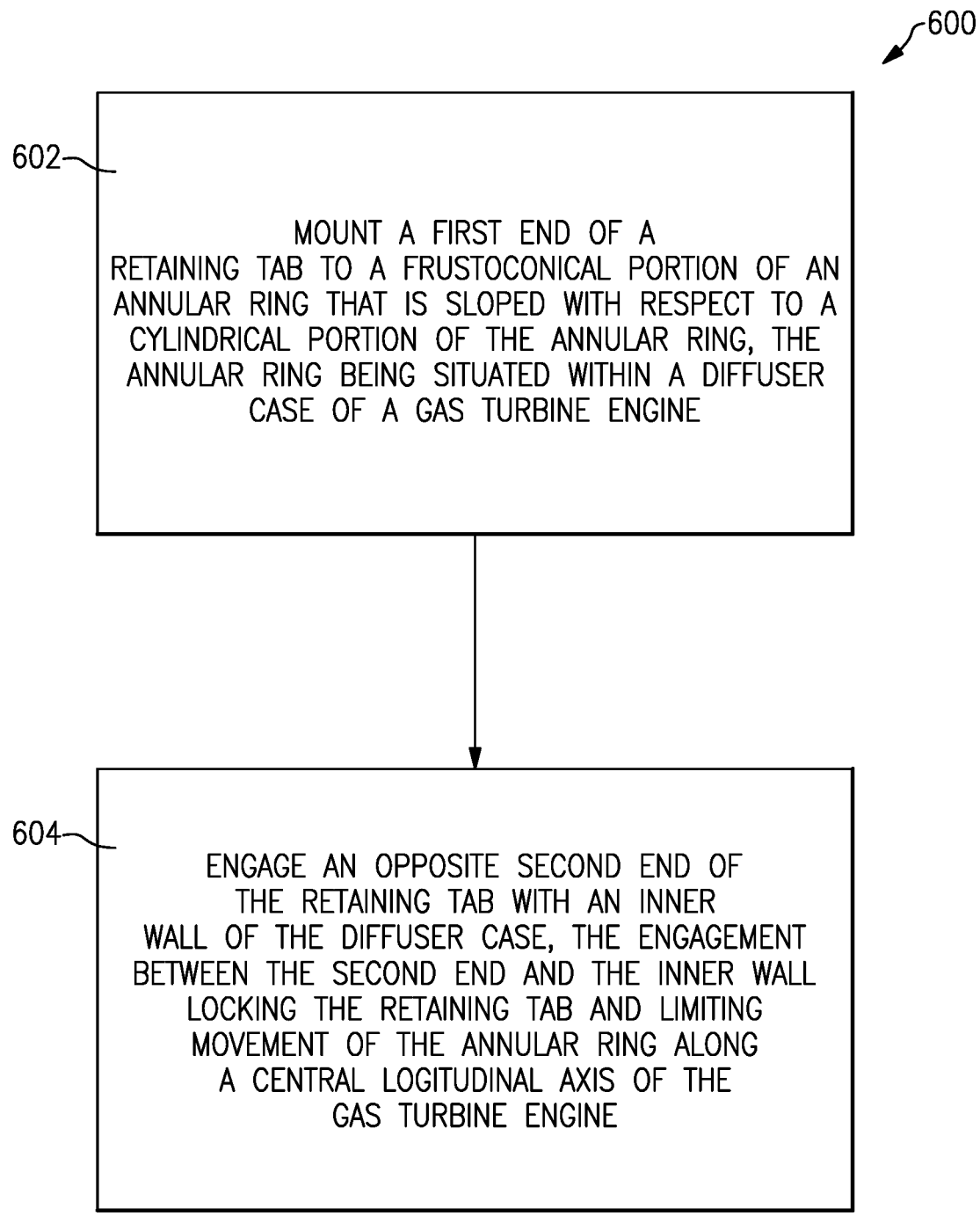
FIG. 12 is a flowchart of a method for restricting movement of an annular ring along an engine central longitudinal axis.

FIG. 12 is a flowchart of a method 600 for restricting movement of an annular ring 74 along the engine central longitudinal axis. A first end 80 of a retaining tab 76 is mounted to a frustoconical section 86 of an annular ring 74 that is sloped with respect to a cylindrical section 84 of the annular ring 74 (block 602). The annular ring 74 is situated within a diffuser case 62 of a gas turbine engine 20. An opposite second end 82 of the retaining tab 76 is engaged with an inner wall 66 of the diffuser case 62 (block 604). The engagement between the second end 82 and the inner wall 66 locks the retaining tab 76 and limits movement of the annular ring 74 along the central longitudinal axis A of the gas turbine engine 20. The method 600 could be part of an original manufacturing process, or could be part of a repair or maintenance assembly process, for example.

In one example, the mounting of block 602 includes inserting a fastener 88 through each of the retaining tab 76 and annular ring 74 in a direction that is perpendicular to each of the retaining tab 76 and the annular ring 74 (e.g., along axis F), and threading a nut 94 onto the fastener 88, and subsequently welding the nut 94 to the fastener 88. The weld 96 limits and/or prevents rotation of the nut 94 with respect to the fastener 88. In one example, the mounting of block 602 and engaging of block 604 are performed such that the annular ring 74 is aft of the annular groove 64. In one example, the engaging of block 604 includes situating the second end 82 of the retaining tab 76 in the annular groove 64.

Although the discussion above has focused on the diffuser 60 section of gas turbine engine 20, it is understood that the features discussed above could be applied to other engine areas where it is desirable to restrict axial movement of an engine component.

The embodiments discussed above can enhance or replace the use of the snap ring 78 to restrict axial movement of engine components (e.g., annular ring 74), reducing the potential that the snap ring 78 may inadvertently dislodges from the annular groove 64, and potentially providing weight savings as well.

Although example embodiments have been disclosed, a worker of ordinary skill in this art would recognize that certain modifications would come within the scope of this disclosure. For that reason, the following claims should be studied to determine the true scope and content of this disclosure.

We claim:

1. A diffuser assembly comprising: a diffuser case; an annular ring, wherein the annular ring comprises an inner cylindrical section and an outer frustoconical section; and a retaining tab that is mounted to the annular ring and has an end that engages an inner wall of the diffuser case, the engagement between the end and the inner wall locking the retaining tab and limiting movement of the annular ring along a central longitudinal axis of the diffuser ease.

2. The diffuser assembly of claim 1, wherein the end of the retaining tab is a second end that is part of a secondary portion of the retaining tab that extends radially outwards from the central longitudinal axis, and an opposite first end of the retaining tab is part of a primary portion of the retaining tab that is angled with respect to the secondary portion at an obtuse angle.

3. The diffuser assembly of claim 2, wherein an area of the primary portion is greater than an area of the secondary portion.

4. The diffuser assembly of claim 1, wherein the annular ring is configured as a seal within the diffuser case.

5. The diffuser assembly of claim 1, wherein the diffuser case defines an annular groove along the inner wall, and the end of the retaining tab is situated in the annular groove.

6. The diffuser assembly of claim 5, further comprising a snap ring situated in the annular groove, wherein the end of the retaining tab is situated between opposing ends of the snap ring.

7. The diffuser assembly of claim 5, further comprising a slot situated within the annular groove, the retaining tab comprising a tooth that engages an end wall within the slot, the engagement between the tooth and the end wall limiting rotation of the annular ring about the central longitudinal axis.

8. The diffuser assembly of claim 1, wherein the outer frustoconical section is sloped with respect to the cylindrical section, and an inner diameter of the frustoconical section connects to the cylindrical section, and an outer diameter of the frustoconical section abuts the inner wall.

9. The diffuser assembly of claim 8, wherein each retaining tab is mounted to the annular ring via one or more fasteners, each fastener extending through an opening in the retaining tab that is aligned with an opening in the frustoconical section.

10. The diffuser assembly of claim 9, wherein the retaining tab is situated between a head of the fastener and an inner face of the frustoconical portion, and the annular ring provides an open band around the head of the fastener.

11. The diffuser assembly of claim 10, wherein the open band has a diameter that is at least three times larger than a diameter of the opening in the retaining tab.

12. The diffuser assembly of claim 9, wherein the end of the retaining tab is a second end that is opposite a first end, and the opening in the frustoconical section is closer to the first end of the retaining tab than to the second end of the retaining tab.

13. A method comprising:
    mounting a first end of a retaining tab to a frustoconical section of an annular ring that is sloped with respect to a cylindrical section of the annular ring, the annular ring being situated within a diffuser case of a gas turbine engine; and
    engaging an opposite second end of the retaining tab with an inner wall of the diffuser case, the engagement between the second end and the inner wall locking the retaining tab and limiting movement of the annular ring along a central longitudinal axis of the diffuser case.

14. The method of claim 13, wherein the diffuser case defines an annular groove along the inner wall, and the engaging comprises situating the second end of the retaining tab in the annular groove.

15. The method of claim 14, wherein the mounting and engaging are performed such that the annular ring is aft of the annular groove.

16. A gas turbine engine comprising:
    a high pressure compressor;
    a combustor that is in fluid communication with the high pressure compressor;
    a diffuser case situated between the high pressure compressor and combustor;
    an annular ring situated within the diffuser case; and
    a retaining tab having a first end that is mounted to the annular ring and an opposite second end that engages an inner wall of the diffuser case, the engagement between the second end and the inner wall locking the retaining tab and limiting movement of the annular ring along a central longitudinal axis of the gas turbine engine.

17. A diffuser assembly comprising:
   a diffuser case;
   an annular ring;
   a snap ring situated in an annular groove of an inner wall of the diffuser case, the snap ring restricting movement of the annular ring along a central longitudinal axis of the diffuser case; and
   a retaining tab that is affixed to either the annular ring or the diffuser case, and has an end retaining the annular ring in the annular groove.

18. The diffuser assembly of claim 17, wherein the end extends in a direction that is parallel to the central longitudinal axis.

19. The diffuser assembly of claim 17, wherein the end is a second end that is cantilevered and is opposite of a first end, and wherein the retaining tab is affixed to the annular ring or the diffuser case at the first end.

20. The diffuser assembly of claim 19, wherein the second end abuts the snap ring.

21. The diffuser assembly of claim 19, wherein a radial distance between the second end and an inner diameter of the snap ring is less than a radial distance between an outer diameter of the snap ring and the inner wall.

* * * * *